(12) United States Patent
Lee et al.

(10) Patent No.: US 11,808,741 B2
(45) Date of Patent: *Nov. 7, 2023

(54) LOW THERMAL MASS GC MODULE

(71) Applicant: PERKINELMER U.S. LLC, Shelton, CT (US)

(72) Inventors: Edgar D. Lee, Shelton, CT (US); Nathan L. Porter, Shelton, CT (US); Anthony D. Rands, Shelton, CT (US); Randall W. Waite, Shelton, CT (US)

(73) Assignee: PERKINELMER U.S. LLC, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,969

(22) Filed: Jan. 6, 2023

(65) Prior Publication Data

US 2023/0152282 A1 May 18, 2023

Related U.S. Application Data

(63) Continuation of application No. 15/636,362, filed on Jun. 28, 2017, now Pat. No. 11,567,041.

(60) Provisional application No. 62/355,761, filed on Jun. 28, 2016.

(51) Int. Cl.
| | |
|---|---|
| *G01N 30/30* | (2006.01) |
| *G01N 30/54* | (2006.01) |
| *G01N 30/00* | (2006.01) |
| *G01N 30/72* | (2006.01) |

(52) U.S. Cl.
CPC ............ *G01N 30/30* (2013.01); *G01N 30/54* (2013.01); *G01N 30/7206* (2013.01); *G01N 2030/0095* (2013.01); *G01N 2030/3053* (2013.01)

(58) Field of Classification Search
CPC ................. G01N 30/54; G01N 30/30; G01N 2030/0095; G01N 2030/3053; G01N 30/7206
USPC ........................................................ 392/488
See application file for complete search history.

(56) References Cited

U.S. PATENT DOCUMENTS

| | | | | |
|---|---|---|---|---|
| 4,043,905 | A * | 8/1977 | Novotny | B01J 20/3078 96/101 |
| 4,207,188 | A * | 6/1980 | Tsuda | G01N 30/6078 210/198.2 |
| 4,732,046 | A * | 3/1988 | Lawrence | G01N 1/4022 250/282 |
| 4,805,441 | A * | 2/1989 | Sides | G01N 30/08 422/89 |
| 5,037,611 | A * | 8/1991 | Ledford, Jr. | G01N 30/16 436/171 |

(Continued)

OTHER PUBLICATIONS

Examination Report for Australian Patent Application No. 2017290706 dated Jul. 7, 2021, 3 pages.

(Continued)

*Primary Examiner* — Eric S Stapleton
(74) *Attorney, Agent, or Firm* — Myers Bigel, P.A.

(57) ABSTRACT

A system and method for performing field-portable GC/MS measurements for the rapid sampling and measurement of high temperature boiling semi-volatile organic compounds in environmental samples, wherein other column bundles have cold spots that may prevent high temperature boiling semi-volatile components from eluting the GC column, this new design may eliminate those cold spots on the GC column.

12 Claims, 19 Drawing Sheets

(56) References Cited

U.S. PATENT DOCUMENTS

| | | | | |
|---|---|---|---|---|
| 5,123,276 | A * | 6/1992 | Hartman | G01N 1/405 73/864.83 |
| 5,152,176 | A * | 10/1992 | Bryselbout | G01N 30/461 422/89 |
| 5,525,799 | A * | 6/1996 | Andresen | H01J 49/0022 250/281 |
| 5,552,042 | A * | 9/1996 | Le Febre | G01N 30/6047 96/101 |
| 5,599,455 | A * | 2/1997 | Hukai | C02F 1/42 210/243 |
| 5,686,656 | A * | 11/1997 | Amirav | G01N 30/12 73/23.41 |
| 5,778,681 | A * | 7/1998 | Li | G01N 30/12 62/51.1 |
| 5,827,353 | A * | 10/1998 | O'Neil | G01N 30/08 95/87 |
| 6,093,371 | A * | 7/2000 | Wilson | G01N 30/12 422/89 |
| 6,190,613 | B1 * | 2/2001 | Watanabe | G01N 30/12 422/89 |
| 6,209,386 | B1 * | 4/2001 | Mustacich | G01N 30/30 73/23.39 |
| 6,217,829 | B1 * | 4/2001 | Mustacich | G01N 30/30 422/89 |
| 6,245,298 | B1 * | 6/2001 | Bremer | G01N 30/12 422/68.1 |
| 6,333,088 | B1 * | 12/2001 | Le Febre | G01N 30/6052 428/36.9 |
| 6,354,136 | B1 * | 3/2002 | Bremer | G01N 30/30 422/89 |
| 6,395,562 | B1 * | 5/2002 | Hammock | G01N 33/543 436/805 |
| 6,490,852 | B1 | 12/2002 | Mustacich et al. | |
| 6,494,939 | B1 * | 12/2002 | Tipler | G01N 30/12 96/105 |
| 6,530,260 | B1 * | 3/2003 | Mustacich | G01N 30/30 422/89 |
| 6,579,345 | B2 * | 6/2003 | Munari | G01N 30/30 95/82 |
| 6,666,074 | B2 * | 12/2003 | Gerner | G01N 30/30 73/61.52 |
| 6,682,699 | B2 | 1/2004 | Mustacich et al. | |
| 6,751,983 | B1 * | 6/2004 | Dienhart | F28D 7/12 165/184 |
| 6,907,796 | B2 * | 6/2005 | Bremer | G01N 30/12 219/628 |
| 7,228,067 | B2 * | 6/2007 | Magni | G01N 30/30 392/480 |
| 7,303,610 | B2 * | 12/2007 | Zilioli | G01N 30/30 73/23.39 |
| 7,409,850 | B2 * | 8/2008 | Traudt | G01N 30/30 95/82 |
| 7,661,460 | B1 * | 2/2010 | Cowans | F28D 7/024 165/163 |
| 7,914,612 | B2 * | 3/2011 | Rubey | G01N 30/30 95/82 |
| 7,984,638 | B2 * | 7/2011 | White | G01N 30/30 73/23.35 |
| 8,117,895 | B2 * | 2/2012 | Currie | G01N 30/56 73/23.35 |
| 8,226,825 | B2 * | 7/2012 | Ross | G01N 30/30 210/198.2 |
| 9,618,484 | B2 | 4/2017 | Zhang et al. | |
| 2003/0037592 | A1 * | 2/2003 | D'Couto | G01N 30/30 73/23.35 |
| 2003/0076041 | A1 * | 4/2003 | Honda | H01J 61/30 313/634 |
| 2004/0159110 | A1 * | 8/2004 | Janssen | F28D 7/0008 62/298 |
| 2006/0124285 | A1 * | 6/2006 | Kite | F28F 1/06 165/163 |
| 2007/0157709 | A1 * | 7/2007 | Gamble | G01N 35/10 73/864.86 |
| 2008/0289397 | A1 * | 11/2008 | Hassan | G01G 3/16 73/23.4 |
| 2009/0173146 | A1 * | 7/2009 | Pursch | G01N 30/30 73/61.52 |
| 2010/0000943 | A1 * | 1/2010 | Carson | G01N 30/84 210/93 |
| 2010/0130796 | A1 * | 5/2010 | Combes | G01N 1/405 568/934 |
| 2011/0106006 | A1 * | 5/2011 | Martin | A61K 31/519 604/93.01 |
| 2012/0198913 | A1 * | 8/2012 | Mustacich | G01N 30/60 73/23.39 |
| 2014/0331744 | A1 * | 11/2014 | Van Egmond | H05B 6/36 29/606 |
| 2015/0185189 | A1 * | 7/2015 | Zhang | G01N 27/622 73/23.37 |
| 2015/0196866 | A1 * | 7/2015 | Botelho | G01N 30/30 96/101 |

OTHER PUBLICATIONS

Translation of Office Action for Chinese Patent Application No. 201780040937.3 dated May 26, 2021, 16 pages.

"Extended European Search Report for corresponding EP application No. 17821175.1 dated Jan. 29, 2020, 9 pages."

"International Preliminary Report on Patentability for PCT/US2017/039807 dated Jan. 1, 2019, 6 pages."

"International Search Report and Written Opinion for PCT/US2017/039807, dated Sep. 14, 2017, 7 pages."

* cited by examiner

LOW THERMAL MASS GC MODULE

CROSS-REFERENCE TO RELATED APPLICATION(S)

This application is a continuation of U.S. patent application Ser. No. 15/636,362, filed Jun. 28, 2017, which claims priority to U.S. Provisional Patent Application No. 62/355,761, filed Jun. 28, 2016, the disclosures of both of which are hereby incorporated by reference in their entireties.

BACKGROUND OF THE INVENTION

Field of the Invention

This invention relates generally to the applicability of field-portable gas chromatograph/mass spectrometer (GC/MS) for the rapid sampling and measurement of high temperature boiling semi-volatile organic compounds.

Description of Related Art

Over the years, many types of analytical instruments have been reduced to a portable or hand-held format to be used in the field, including X-ray Fluorescence Analyzers, Laser-induced Breakdown Spectroscopy, Raman Spectroscopy, Fourier Transform Infrared Spectroscopy and Near-infrared Spectroscopy analyzers. However, shrinking a GC/MS to a field-portable configuration, while maintaining laboratory analytical performance, is a much greater challenge. Most of the previous attempts have utilized "point-and-shoot" approaches which have not required any type of sample preparation or sample introduction accessories. For that reason, the practical value of a field-portable instrument is reduced significantly if it necessitates complex sample preparation or delicate procedures are required to introduce the sample into the instrument.

Furthermore, presently available column bundles may have cold spots that prevent high temperature boiling semi-volatile compounds from eluting the GC column. Accordingly, it would be an advantage over the state of the art to have a field-portable GC/MS instrument that is capable of eliminating the cold spots.

For example, FIG. 1 illustrates a low thermal mass (LTM) column bundle, or GC module, that is formed into a toroidal bundle 12 and surrounded by foil 14 as known in the prior art. A quarter is shown in the illustration for size comparison purposes only. FIG. 1 shows an insulated GC column 10 that is coiled multiple times inside the toroidal bundle 12. Also interspersed within the toroidal bundle 12 is an insulated heating wire 16 and a temperature sensor 18, both of which are also coiled within the conductive foil 14. The positioning of the insulated GC column 10, the temperature sensor 18 and the insulated heating wire 16 may be random or pseudo-random as shown.

It is well recognized that high-temperature program methods are normally required for the determination of semi-volatile analytes such as PAHs and pesticides in various sample matrices. However, when using the prior art LTM column technology such as the toroidal bundle 12 shown in FIG. 1, it is fairly typical to get poor peak shapes and resolution at these elevated temperatures. This problem is mainly caused by the real temperature in the GC column 10 not matching the values that were set in the method, due to the cooler sites 20 existing on the GC column, especially in areas that are located near to the conductive foil 14. In addition, there may also be cooler sites 20 on the GC column 10 which are not close to where the temperature sensors 18 are disposed. This phenomenon is exemplified in FIG. 1, which shows an example of only some of the possible cooler sites 20 inside the toroidal bundle 12.

BRIEF SUMMARY OF THE INVENTION

A first embodiment of the present invention includes a system and method for performing field-portable GC/MS measurements for the rapid sampling and measurement of high temperature boiling semi-volatile organic compounds in environmental samples, wherein cold spots in capillary tubing of the GC column that may prevent high temperature boiling semi-volatile components from eluting the GC column may be eliminated from a new design of a low thermal mass (LTM) GC module.

These and other objects, features, advantages and alternative aspects of the present invention will become apparent to those skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

This document describes results from a field-portable GC/MS (Torion T-9, PerkinElmer Inc, Shelton, Conn.) for a wide variety of samples (gas, liquid, solid), including the analysis of high-boiling, semi-volatile organic compounds (SVOC) with a typical analysis time of less than 10 minutes.

Figure 1:
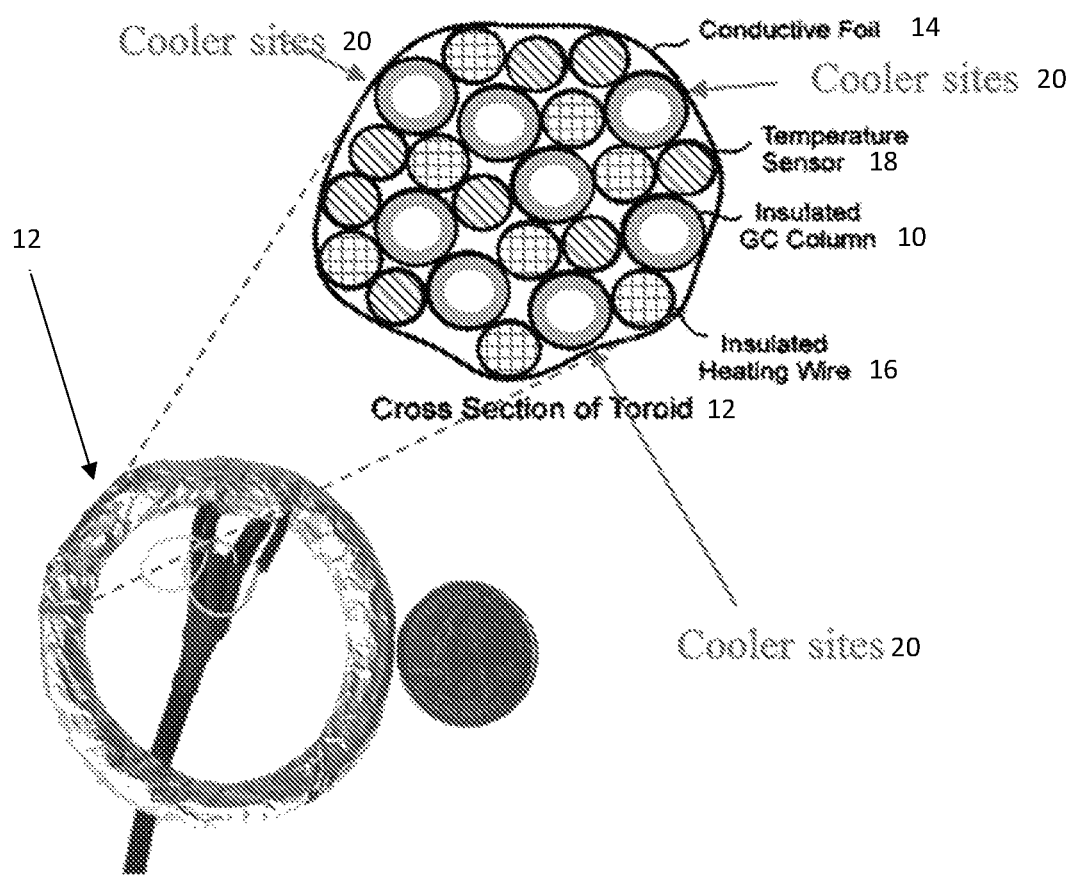
FIG. 1 shows possible cooler sites experienced with standard LTM column bundle technology of the prior art.
Figure 2:
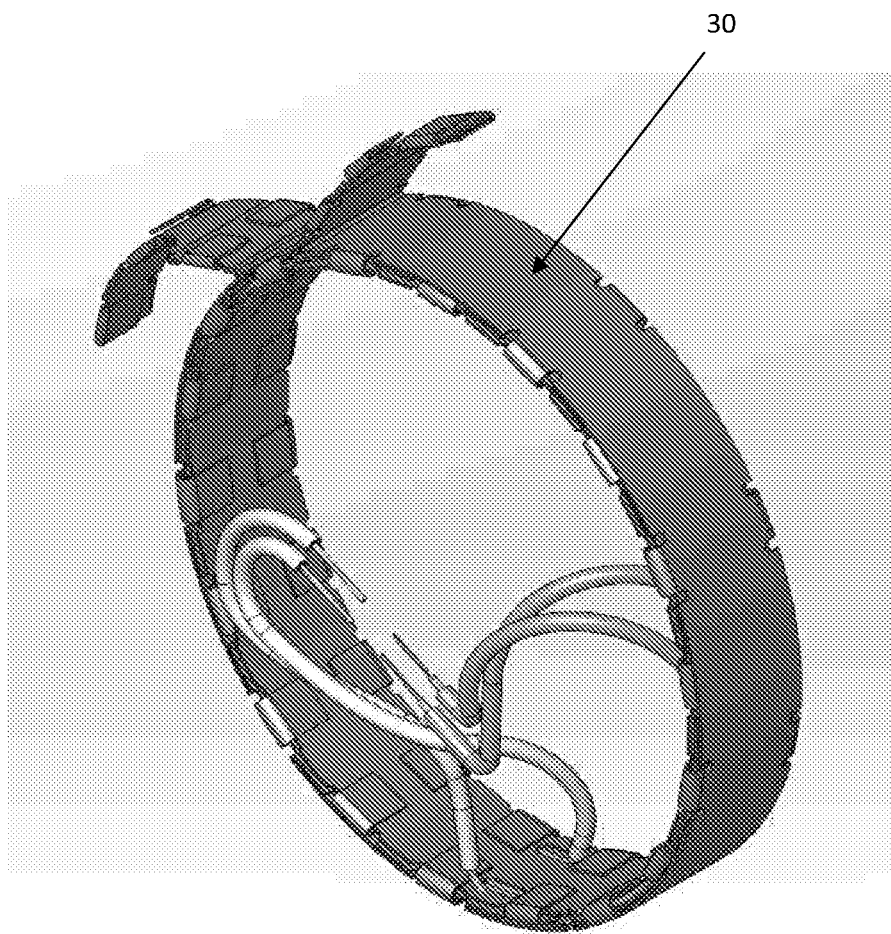
FIG. 2 is a perspective view of the first embodiment of a low thermal mass GC module for use in a field-portable GC/MS that minimizes cool spots in capillary tubing to enable rapid sampling and measurement of high temperature boiling semi-volatile organic compounds.

In order to minimize cool sites within a LTM GC module as described in FIG. 1, a new LTM GC column bundle was designed as shown in FIG. 2. FIG. 2 shows the first embodiment of a LTM GC column 30 that uses thin aluminum covers to wrap around a single-layer ordered-arrangement GC column and insulated heating wire. This column may provide identical heat distribution while virtually eliminating or at least minimizing cooler spots along the column, thus improving the chromatographic separation for SVOCs at the high temperature GC runs required for high temperature boiling point compounds. The principles of this new LTM GC module 30 are shown in a first embodiment beginning with FIG. 2.

FIG. 2 shows a perspective view of a first embodiment of a LTM GC module 30. The LTM GC module 30 may be comprised of a LTM heater column assembly, a LTM capillary column assembly, and a sensor assembly.

Figure 3:
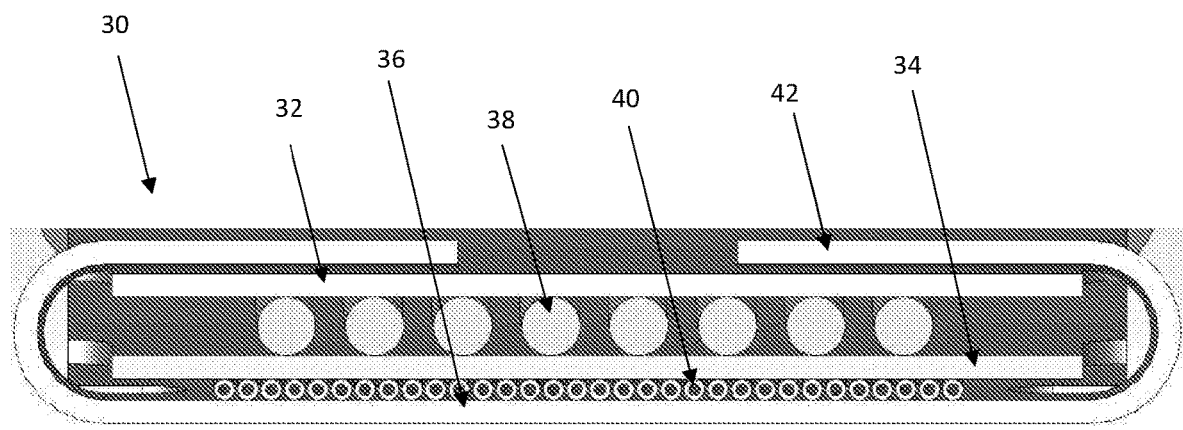
FIG. 3 is a cross-sectional view of the LTM GC module shown in FIG. 2.

FIG. 3 is a cross-sectional view of the LTM GC module 30 shown in FIG. 2. The cross-sectional view shows the various components of the GC column 30 design. The LTM GC module 30 may include an inner column ring 32, a middle column ring 34, and an outer column ring 36. Tabs 42 may also be provided on the Outer column ring 36 so that they may be folded over the Inner column ring 32 and hold the LTM GC module together in a desired shape. The inner column ring 32, middle column ring 34, and outer column ring 36 may be comprised of a thermally conductive material such as aluminum.

As shown, a heating wire 38 may be disposed between the inner column ring 32 and the middle column ring 34. Furthermore, a single layer of capillary tubing 40 may be disposed between the middle column ring 34 and the outer column ring 36. A temperature sensor is not shown in this figure but will be shown later.

The heating wire 38 is disposed between the inner column ring 32 and the middle column ring 34 so that there is heating of an inner surface of the middle column ring 34. As stated, a material is selected for the middle column ring 34 such that heat may be uniformly transferred through the middle column ring 34 to an outer surface thereof.

It should be understood that the specific number of times that the heating wire 38 is wound around the inner column ring 32 is not important and may depend on the gauge of the heating wire 38 being used. What is important is that the heating of the inner surface of the middle column ring 34 that is disposed over the heating wire 38 should be substantially uniform. Accordingly, the number of coils of the heating wire 38 around the inner column ring 32 may be varied from that shown in FIG. 3. Furthermore, the heating wire 38 may overlap as long as it does not interfere with the uniform heating of the inner surface of the middle column ring 34. Therefore, any overlap of the heating wire should also be uniform so that the heating of the middle column ring 34 is uniform.

The heating wire may be any appropriate thickness and material. In the example shown in FIG. 3, the heating wire 38 is 27 AWG, but this is only an example and should not be considered to be limiting of the thickness of heating wire that may be used.

Similarly, the LTM GC column 32 may include capillary tubing of approximately 0.10 mm ID and be approximately 5.5 meters in length. It should be understood that these dimensions are for illustration purposes only and are not limiting of the dimensions that may be used. The GC column used in a field-portable gas chromatograph/mass spectrometer (GC/MS) may only be limited by the application and the dimension of the outer column ring 36. Thus, it may that the ID and length of the capillary tubing may be larger or smaller in order to change resolution and sensitivity. Accordingly, the ID and length of the capillary tubing may only be limited by the size of the inner, middle and outer column rings 32, 34, 36 that enable the capillary tubing to be wound in a single layer on the middle column ring. Furthermore, it should be understood that no such size limitations are present in a benchtop version of the GC column.

Figure 4A:
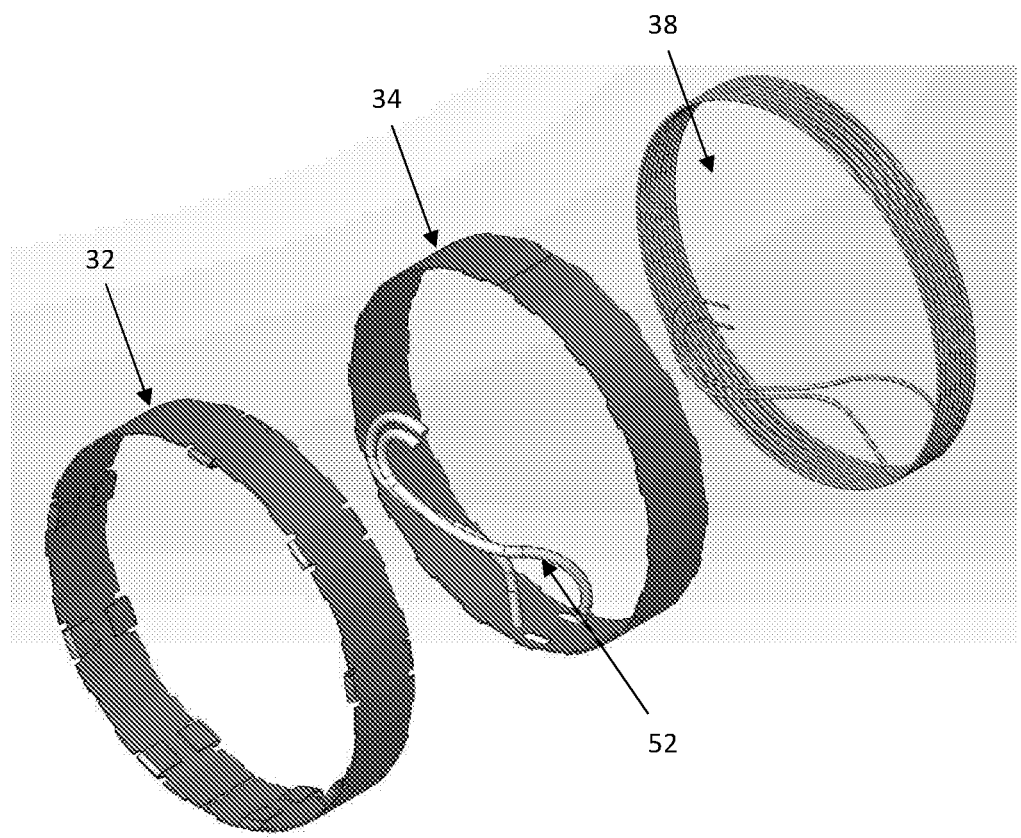
FIG. 4A is a perspective and exploded view of a LTM heater column assembly used in the LTM GC module.

FIG. 4A is a perspective and exploded view of the LTM heater column assembly 50. The assembled LTM heater column assembly 50 shown in FIG. 4B may be comprised of the inner column ring 32, the middle column ring 34, and the heating wire 38 disposed between as shown in FIG. 4A. Heating wire sleeves 52 may be used to cover the exposed leads of the heating wire 38.

Figure 5A:
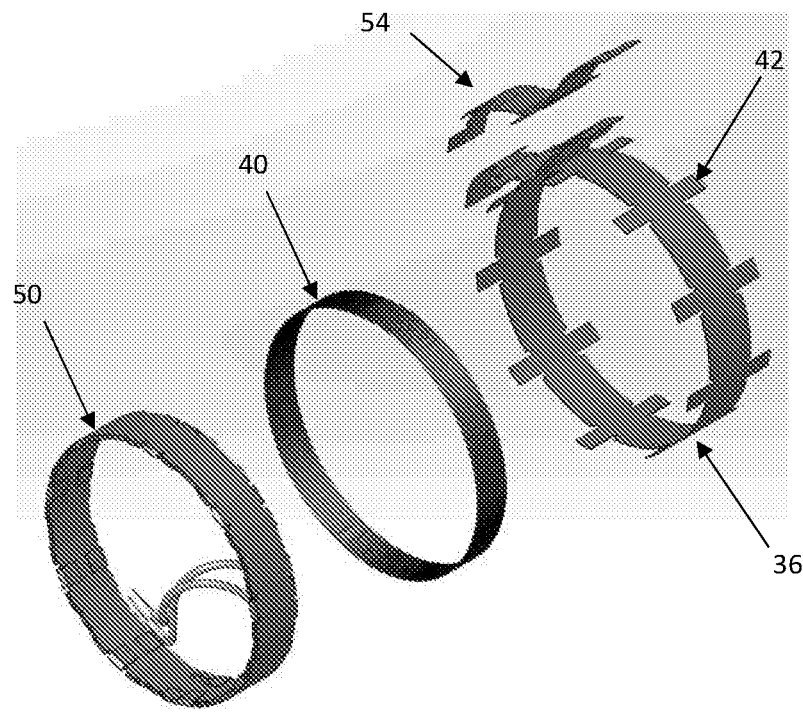
FIG. 5A is a perspective and exploded view of the various components that are assembled to form the LTM GC module.

FIG. 5A is a perspective and exploded view of the LTM heater column assembly 50, the capillary tubing 40, the outer column ring 36, a flange cover 54, and a plurality of tabs 42. The capillary tubing 40 is wound around the outside surface of the LTM heater column assembly 50, and then the outer column ring 36 is disposed around the capillary tubing.

Figure 5B:
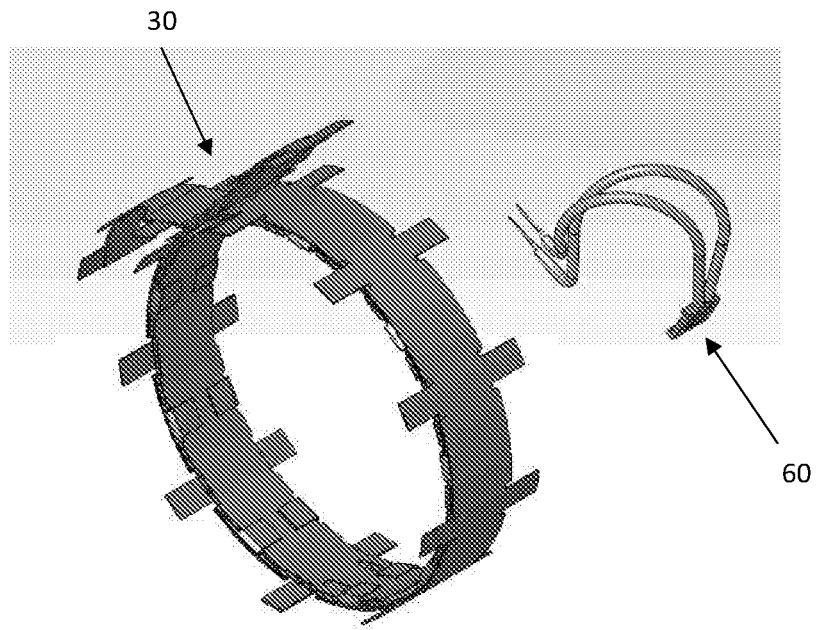
FIG. 5B is a perspective view of the assembled LTM GC module shown in FIG. 5A.

FIG. 5B shows the assembled components that form the LTM GC module 30, along with a detached temperature sensor 60. The completely assembled LTM GC module 30 is shown in FIG. 2. The temperature sensor 60 may be capable of sensing a wide range of temperatures, such as from −70 to 500 degrees C. However, this temperature range should only be considered as an example and not a limitation of the first embodiment.

There are several aspects of the first embodiment shown in FIGS. 2 through 5B that are important for the LTM GC module 30 to function as desired.

Figure 4B:
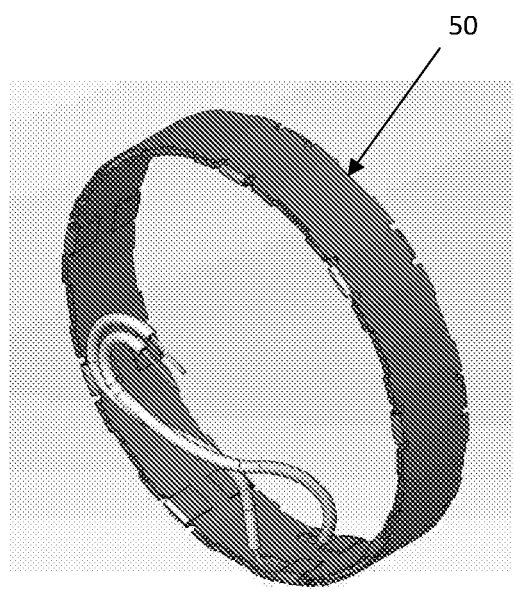
FIG. 4B is a perspective view of the assembled LTM heater column assembly shown in FIG. 4A.

In a first aspect shown in FIG. 4B, the LTM heater column assembly 50 needs to provide a continuous heating surface on the outer surface of the middle column ring 34. The outer surface of the middle column ring 34 is essentially the surface of a cylinder.

Another aspect of the first embodiment is that the outer surface of the middle column ring 34 needs to be substantially smooth such that if a flexible object is wrapped around the middle column ring 34, it will always make contact with the outer surface in order to provide uniform heating of an object on the outer surface.

Another aspect of the first embodiment is that the heating wire 38 that is wound around the inner column ring 32 needs to be wound in such a way that when the middle column ring 34 is placed around the inner column ring to enclose the heating wire between the inner and middle column rings 32, 34, the result should be that the outer surface of the middle column ring 34 is heated equally. This may be accomplished by any method of winding the heating wire 38 around the inner column ring 32 that allows equal heating to occur. For example, there may be equal distribution of the heating wire 38 on the inner column ring 32. An equal distribution may require equal spacing or elimination of all spacing between the windings of the heating wire 38.

However, it may not sufficient that the inner column ring 34 provides a uniformly heated outer surface. Another aspect of the first embodiment is that the capillary tubing 40 must be wound around the middle column ring 34 in such a way that all of the capillary tubing around the middle column ring is heated equally. Equal heating of the capillary tubing 40 may be accomplished by winding the capillary tubing such that no portion of the capillary tubing is overlapping any other portion. Thus, if all of the capillary tubing 40 is in contact with the outer surface of the middle column ring 34, then cold spots may be minimized. Therefore, it is likely that the capillary tubing 40 is in a single-layer arrangement.

Another aspect of the first embodiment of the present invention is that the temperature sensor 60 may not have to be disposed along the entire length of the capillary tubing 40 as in the prior art shown in FIG. 1. Because the temperature of the LTM GC module 30 may be uniform because of the arrangement of the heating wire 38 and the capillary tubing 40, the temperature sensor 60 may be disposed in only a single location on the LTM GC module. In this example, the temperature sensor 60 may be disposed on the inside of the inner column ring 32.

Figure 6A:
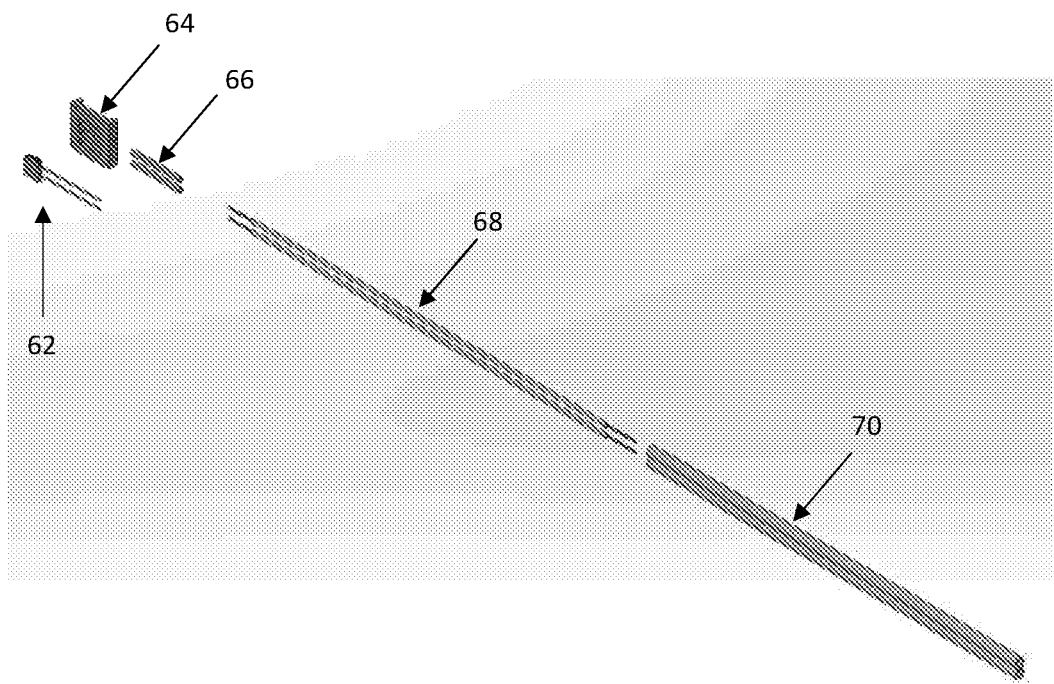
FIG. 6A is a perspective and exploded view of the components of the temperature sensor.

FIG. 6A is a perspective and exploded view of the components of the temperature sensor 60 of the first embodiment of the invention. The temperature sensor 60 may include a resistance temperature detection (RTD) sensor as known to those skilled in the art. However, any suitable temperature sensor may be used in the first embodiment of the invention.

The temperature sensor 60 may include an RTD sensor 62, a housing 64, crimp tubing 66, two hook-up wires 68 and two insulated wire sleeves 70.

Figure 6B:
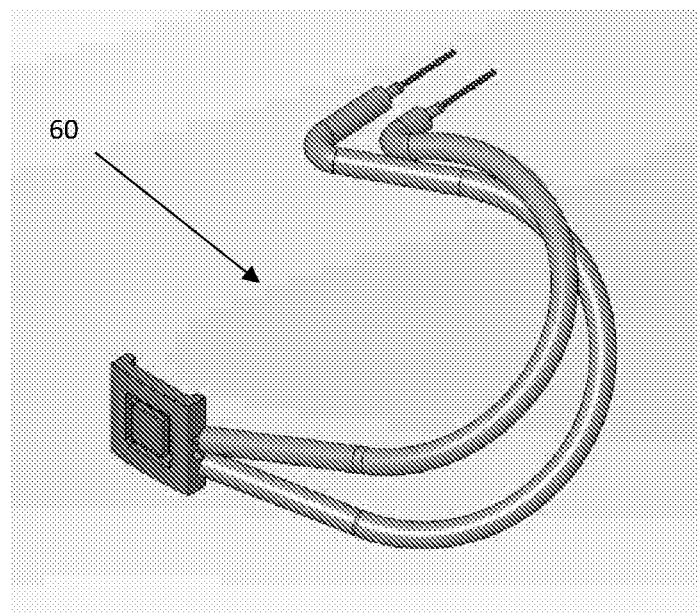
FIG. 6B is a perspective view of the assembled temperature sensor of FIG. 6A.

FIG. 6B is a perspective view of the assembled components of the temperature sensor 60 as used in the first embodiment.

Figure 7:
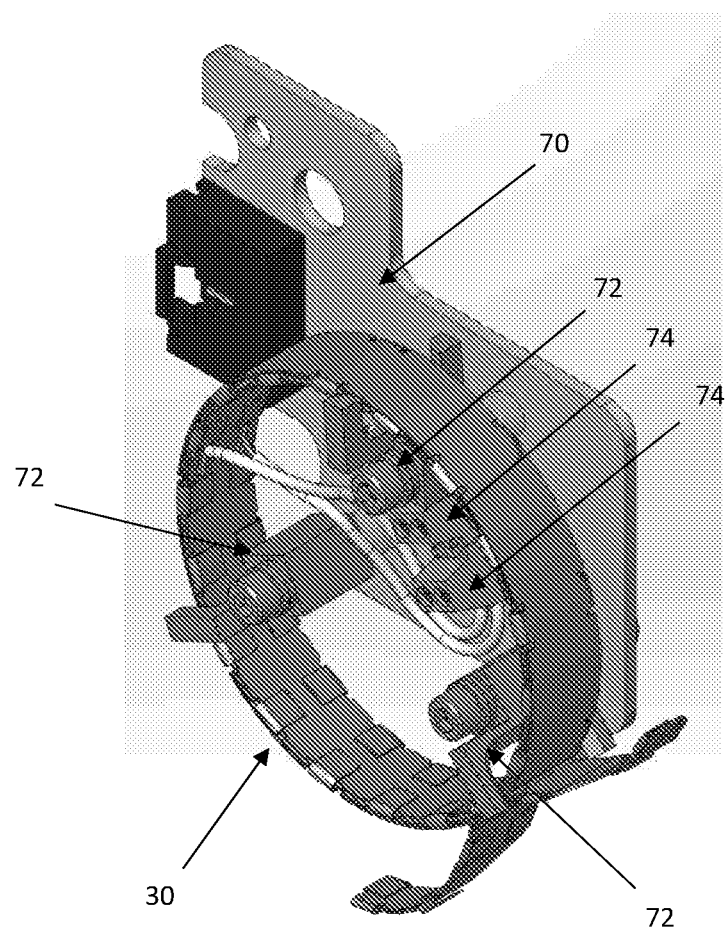
FIG. 7 is a perspective view of the fully assembled LTM GC module which has been disposed on a mounting board.

FIG. 7 is a perspective view of the fully assembled LTM GC module 30 which has been disposed on a mounting board 70. A plurality of insulator columns 72 are used to hold the LTM GC module 30 above the mounting board 70.

The number of insulator columns 72 may vary and should not be considered to be a limitation of the first embodiment of the invention. Connectors 74 are coupled to the heating wire 38 and to the temperature sensor 60 and may be used to send signals to and receive signals from off the mounting board 70.

In order for the LTM GC module 30 to be suitable for use in a field-portable GC/MS unit, the diameter of the outer column ring 36 should be kept relatively small. Using capillary tubing of the size given in the example, the diameter of the outer column ring 36 may be 10 cm or smaller.

In a summary of the first embodiment, a heating system is taught for minimizing cold spots in capillary tubing of a column used for performing field-portable Gas Chromatography/Mass Spectrometer (GC/MS) measurements. The components of such a heating system may include an inner cylindrical ring, a heating wire disposed around the inner cylindrical ring, a middle cylindrical ring disposed around the heating wire and the inner cylindrical ring, wherein the heating wire uniformly heats the middle cylindrical ring, a capillary tubing used as a GC column is disposed around an outer surface of the middle cylindrical ring, wherein the capillary tubing does not overlap itself on the middle cylindrical ring, and an outer cylindrical ring is disposed around the capillary tubing and the middle cylindrical ring.

The heating system may also include a temperature sensor disposed on the inner cylindrical ring to thereby enable temperature readings of the inner cylindrical ring, and thus the LTM GC column 30. In order to keep the system for use in a field-portable GC/MS measurement system, the outer cylindrical ring may be less than 10 cm in diameter.

This document describes results from a field-portable GC/MS (Torion T-9, PerkinElmer Inc, Shelton, Conn.) for a wide variety of samples (gas, liquid, solid), including the analysis of high-boiling, semi-volatile organic compounds (SVOC) with a typical analysis time of less than 10 minutes. The semi-volatile compounds studied include: separating a mixture of polycyclic aromatic hydrocarbons (PAH) with a boiling point range from napthalene (218° C.) to benzo perylene (550° C.); characterization of a suite of organochlorine pesticides with a boiling point range from dichlroan (130° C.) to deltamethrin (572° C.); quantifying a mixture of terpenes with boiling points of 155-177° C.; detecting a natural compound such as geosmin with a boiling point of 270° C., which is a byproduct of bacterial activity in environmental water samples; analysis of PAHs in asphalt and coal tar-based gravel samples; and screening for phenolic compounds and phthalate esters in water, which are used in the manufacture of many plastic components.

To better understand the practical capabilities of the first embodiment, it's worth giving a brief overview of its capabilities. Although this technology was built for portability and speed, the gas chromatograph was designed to provide equivalent chromatographic resolution and performance to a benchtop system. The miniature size is achieved by replacing a conventional capillary column and convection oven with a low thermal mass (LTM) GC column bundle using direct-contact electrical resistive heating. In this design, a small diameter, metal capillary column may be bundled with resistive heating and temperature-sensing wires that may be braided together with insulator strands. This approach may provide for more controlled heating, greater heating and cooling speeds and very low power consumption. Because column heating requires considerably less operating power than a conventional GC, longer battery-lifetime may be experienced. With its combination of direct resistive heating and rapid temperature ramp rates, the first embodiment may separate multi-component analytes in a few minutes.

The mass spectrometer may use a toroidal ion trap configuration, which is well-suited for miniaturization compared to other types of mass spectrometers, such as conventional cylindrical ion traps or linear quadrupole traps. The novel configuration of the first embodiment may allow for large trapping volumes despite its miniaturized size. The result may be high ion counts and increased sensitivity, low noise levels and good spectral quality. The ion trap mass analyzer may be heated to ~175° C. and operate under vacuum, which may result in the electrodes staying clean for long periods of time. This may reduce the need for frequent maintenance, while increasing mass spectral quality and reproducibility. Performing at an elevated temperature may also lead to long-term MS resolution stability, providing unit mass resolution over the 45-500 amu mass range.

The sample preparation station also offers the capability of different modules in the field, including sample desorption (SD), heated headspace (HS), purge and trap (PT) as well as an internal standard (IS) addition module. It can easily be configured for specific application requirements for sample preparation and analysis at the sampling location. It allows for transfer of air samples collected on conventional-sized collection traps to micro traps for injection into the micro-bore capillary GC. During this desorption process, the analytes are transferred from a conventional trap to the instrument's needle trap for injection into the GC-MS. The complete module can be operated either from a laboratory gas supply (helium or nitrogen) and line power, or it can operate from battery power and an internal tank of pressurized gas.

In addition, the use of on-board libraries can not only identify unknown target compounds but also allow users to custom build target compound libraries. This feature is supported by deconvolution algorithms to ensure reliable identification of even co-eluting compounds in complex mixtures, and used in conjunction with an extensive NIST database; unknown peaks can be easily identified.

To obtain a better understanding of the practical capabilities of the first embodiment for the separation and analysis of semi-volatile compounds, a comparison was made between a prior art LTM GC column and the LTM GC column of the first embodiment for a suite of semi-volatile organic compounds with a boiling point range of 200-570° C.

Three mixtures of semi-volatile compounds were evaluated, including 18 PAHs compounds, 17 organochlorine pesticides compounds, and 10 pyrethroid pesticides compounds. The same amount of each sample was introduced into three different systems by a solvent free, coil wire filament (CWF) injection system, and run using exactly the same GC chromatographic separation and mass spectrometer operating conditions shown in Table 1.

TABLE 1

Gas Chromatographic Separation Conditions

| | |
|---|---|
| Sample Delivery | Coil Wire Filament Injection |
| Injection Type | Split/Splitless |
| Injector Temperature | 300° C. |
| Transfer Line Temperature | 280° C. |
| Trap Temperature | 200° C. |
| Column Technology (Restek ®, State College, PA) | MXT ®-5: low-polarity phase diphenyl dimethyl polysiloxane; 5 m × 0.1 mm × 4 μm |

TABLE 1-continued

| | |
|---|---|
| Initial Temperature/Hold Time | 50° C. for 10 s |
| Temperature Ramp Rate | 20° C./sec |
| Final Temperature/Hold Time | 300° C. for 125 s |

Mass Spectrometer Operating Conditions

| | |
|---|---|
| Mass Spectrometer | Toroidal Ion Trap |
| Ionization Source | Electron Capture |
| MS Operating Temperature | 175° C. |
| Mass Range | 45-500 amu |
| Resolution | <1 amu at 300 amu |
| MS Scan Rate | 10-15 scans/sec |
| Detector | Electron Multiplier |

The concentration of each compound in the three different mixtures is shown in in Table 2.

TABLE 2

| Na | Component | Working Std 1 in MeOH, ug/mL |
|---|---|---|
| | Organochlorine Pesticide Mix | |
| 1 | Aldrin | 10 |
| 2 | α-BHC | 10 |
| 3 | γ-BHC | 10 |
| 4 | β-BHC | 10 |
| 5 | δ-BHC | 10 |
| 6 | 4,4'-DDD | 10 |
| 7 | 4,4'-DDE | 10 |
| 8 | 4,4'-DDT | 10 |
| 9 | Dieldrin | 10 |
| 10 | Endosulfan I | 10 |
| 11 | Endosulfan II | 10 |
| 12 | Endosulfan Sulfate | 10 |
| 13 | Endrin | 10 |
| 14 | Endrin aldehyde | 10 |
| 15 | Heptachlor | 10 |
| 16 | Heptachlor epoxide (isomer B) | 10 |
| 17 | Methoxychlor | 10 |
| | PAH mix | |
| 1 | Acenaphthene | 9.93 |
| 2 | Acenaphthylene | 19.86 |
| 3 | Anthracene | 1.01 |
| 4 | Benz(a)anthracene | 1.01 |
| 5 | Benzo(a)pyrene | 1.00 |
| 6 | Benzo(b)fluoranthene | 2.03 |
| 7 | Benzo(k)fluoranthene | 1.01 |
| 8 | Benzo(g,h,i)perylene | 1.98 |
| 9 | Cltrysene | 1.01 |
| 10 | Dibenz(a,b)anthracene | 2.00 |
| 11 | Fluoranthene | 2.01 |
| 12 | Dfluorene | 2.03 |
| 13 | Indeno(1,2,3-cd)pyrene | 1.01 |
| 14 | Napthalene | 10.01 |
| 15 | Phenanthren | 1.00 |
| 16 | pyrene | 1.00 |
| 17 | 1-Methylnaphthalene | 9.95 |
| 18 | 2-Methylnaphthalene | 9.88 |
| | Pesticide Mix 14 | |
| 1 | Cyfluthrin | 5.07 |
| 2 | L-Cyhalothrin | 4.98 |
| 3 | Cypermethrin | 5.03 |
| 4 | Deltamethrin | 5.05 |
| 5 | Dichloran | 1.00 |
| 6 | Fevalerate | 5.03 |
| 7 | Pendimethalin | 1.02 |
| 8 | Permethrin | 4.96 |
| 9 | Tetrachloviep bos | 0.10 |
| 10 | Tefluthrin | 0.98 |

Figure 8:
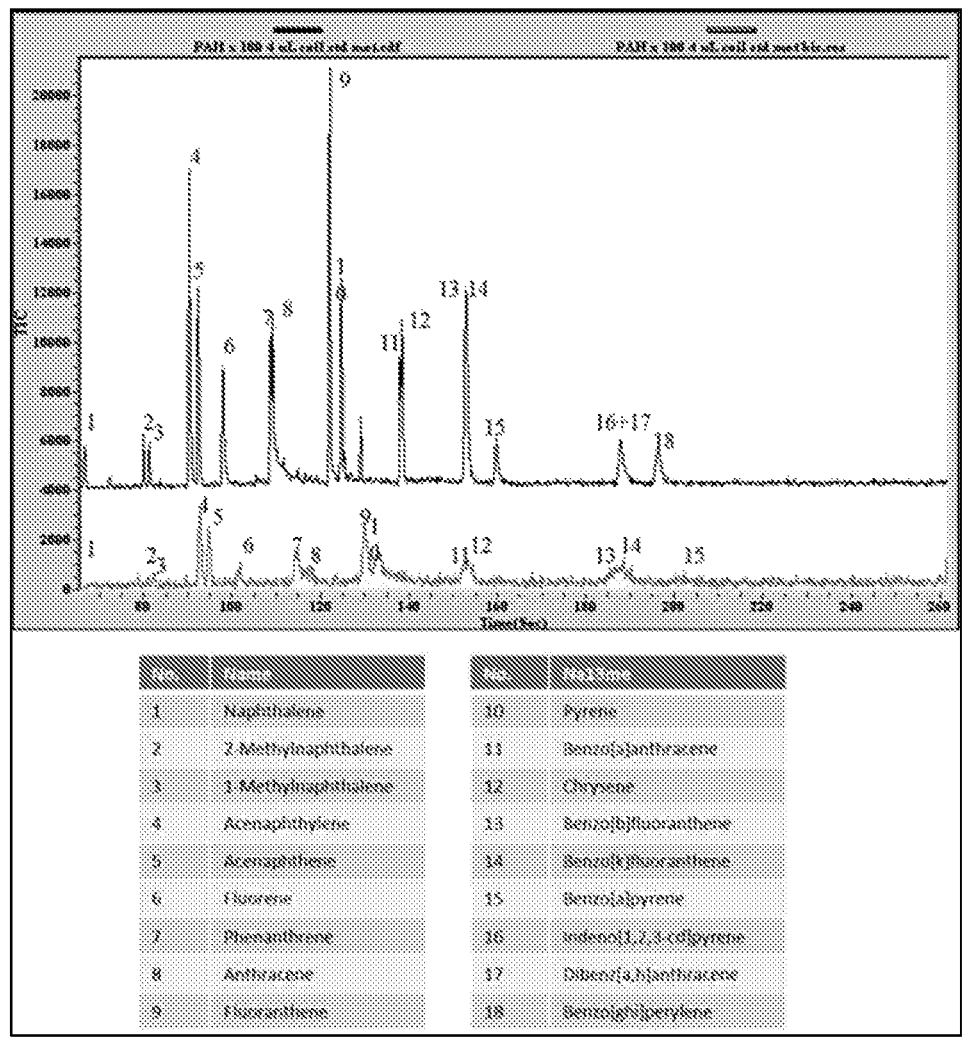
FIG. 8 is a chromatographic comparison between a standard LTM column (red) and the new LTM column (black) described in this study for the separation and analysis of a mix of 18 PAH compounds (labeled and identified 1-18).
Figure 9:
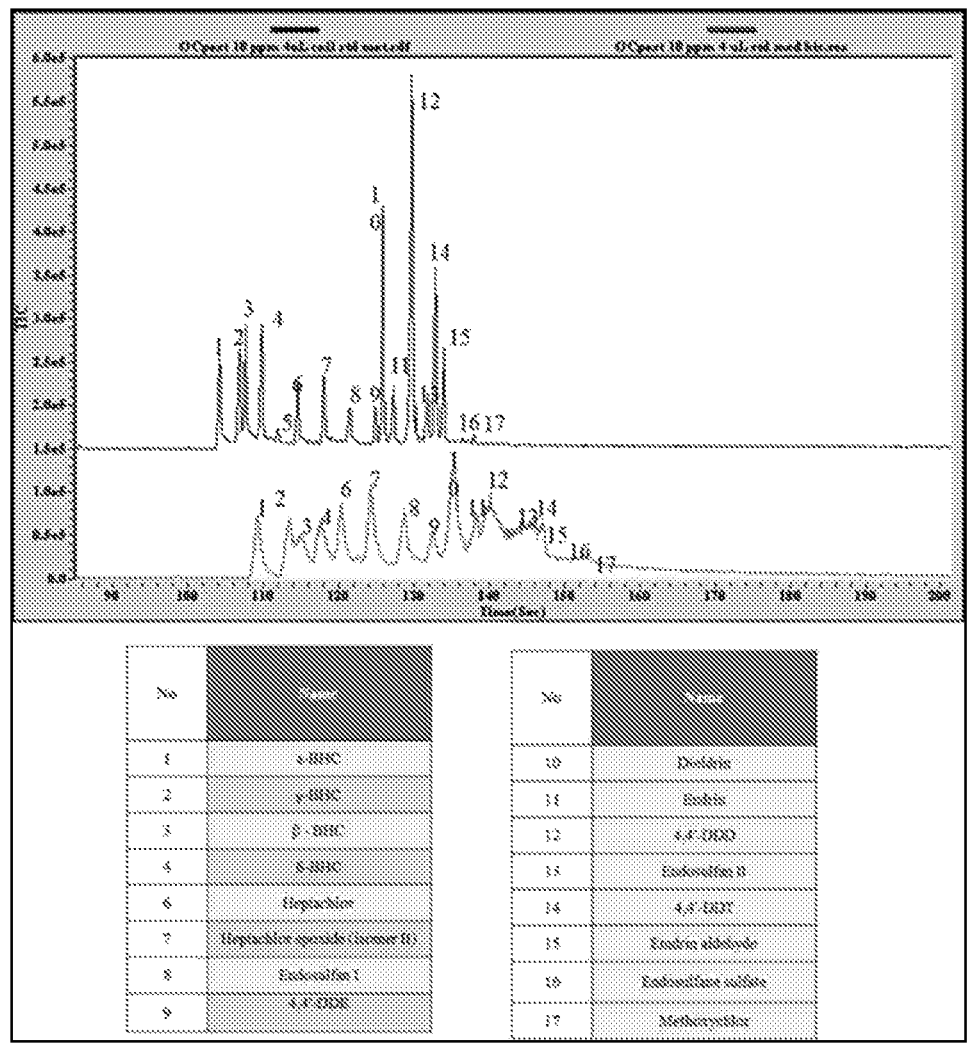
FIG. 9 is a chromatographic comparison between a standard LTM column (red) and the new LTM column (black) described in this study for the separation and analysis of a mix of 17 organochlorine pesticide compounds (labeled and identified 1-17).
Figure 10:
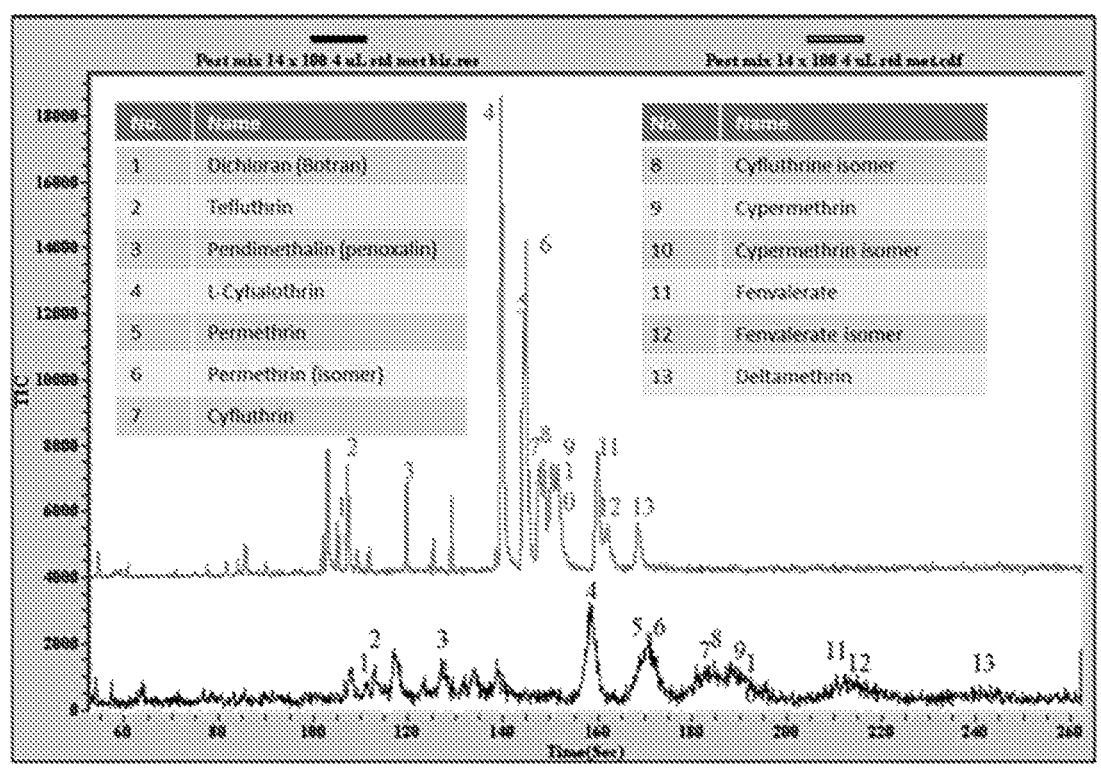
FIG. 10 is a chromatographic comparison between a standard LTM column (black) and the new LTM column (red) described in this study for the separation and analysis of a mix of 10 pyrethroid pesticide compounds and three isomers (labeled and identified 1-13).

The comparative chromatograms of each mixture can be seen in FIG. 8 (18 PAH compounds, FIG. 9 (17 organochlorine pesticides), and FIG. 10 (10 pyrethroid pesticides). The standard LTM column chromatograms are shown in red, while the new LTM column versions are in black.

From FIGS. 8, 9 and 10, several observations may be made. First, peak shapes and resolution appeared to be much worse in the prior art LTM GC column because it generated wider peaks with a noisier background. Next, the retention times of the peaks in the prior art LTM GC column were substantially longer. Also, peak intensities in the LTM GC column of the first embodiment were significantly higher than those in the conventional one. And finally, a standard LTM GC column could not separate and elute components 16, 17 and 18 in the PAH mix, because of their very low volatility (boiling points 524-550° C.)

An analysis of a suite of different semi-volatile organic compounds, with a wide range of boing points is now provided.

Figure 11:
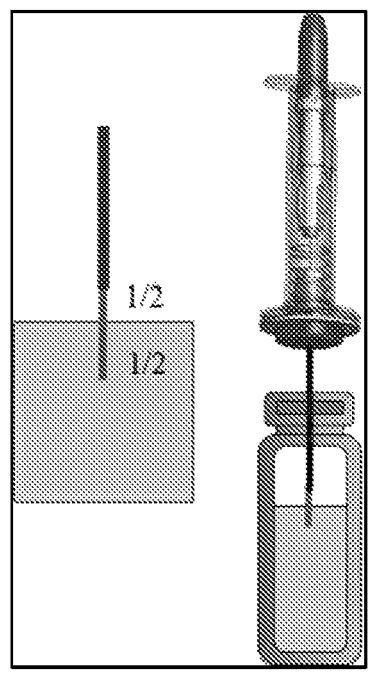
FIG. 11 illustrates that the fiber is placed half in the head space and half immersed into the liquid phase of the sample.

Terpenes are a large class of organic compounds, produced by a variety of plants, including conifers, hops, and cannabis with a typical boiling point range of 150-180° C. They are the primary constituents of the essential oils of many types of plants and flowers widely used as fragrances in perfumery, as well as for medicinal purposes. Synthetic variations and derivatives of natural terpenes are also used for a variety of aromas and flavors used as food additives. Therefore, to exemplify the capability of this technology, four terpene compounds were spiked into 200 mL of 0.6% NaCl in water. The analytes were then extracted using half/half solid phase micro extraction (SPME) polydimethylsiloxane/divinylbenzene (PDMS/DVB) 65 µm fibers at room temperature (22° C.) for 15 minutes without shaking or vibrating. With this sampling approach, the fiber is placed half in the head space and half immersed into the liquid phase of the sample, as shown in FIG. 11.

The four terpene analytes were extracted by half/half SPME (PDMS/DVB 65 µm fibers) at room temperature (22° C.) for 15 minutes, before being injected into the GC/MS.

Figure 12:
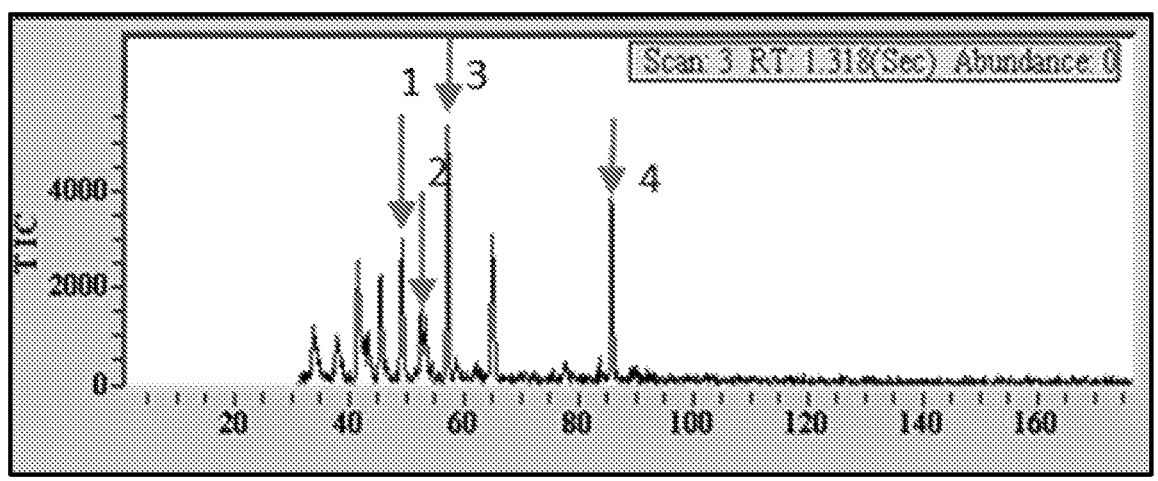
FIG. 12 illustrates a total ion chromatogram of (1) Alpha+pinene, (2) Myrcene, (3) Alpha+limonene, and (4) Isolongifolene.

This sample was then injected into the GC/MS system using similar conditions described earlier, with the exception that the final temperature of 280° C. was held for 50 s, making a total analysis time of 175 s. The total ion chromatogram (TIC) of the four terpenes (Alpha+pinene, Myrcene, Alpha+limonene, and Isolongifolene), is shown in FIG. 12.

Figure 13:
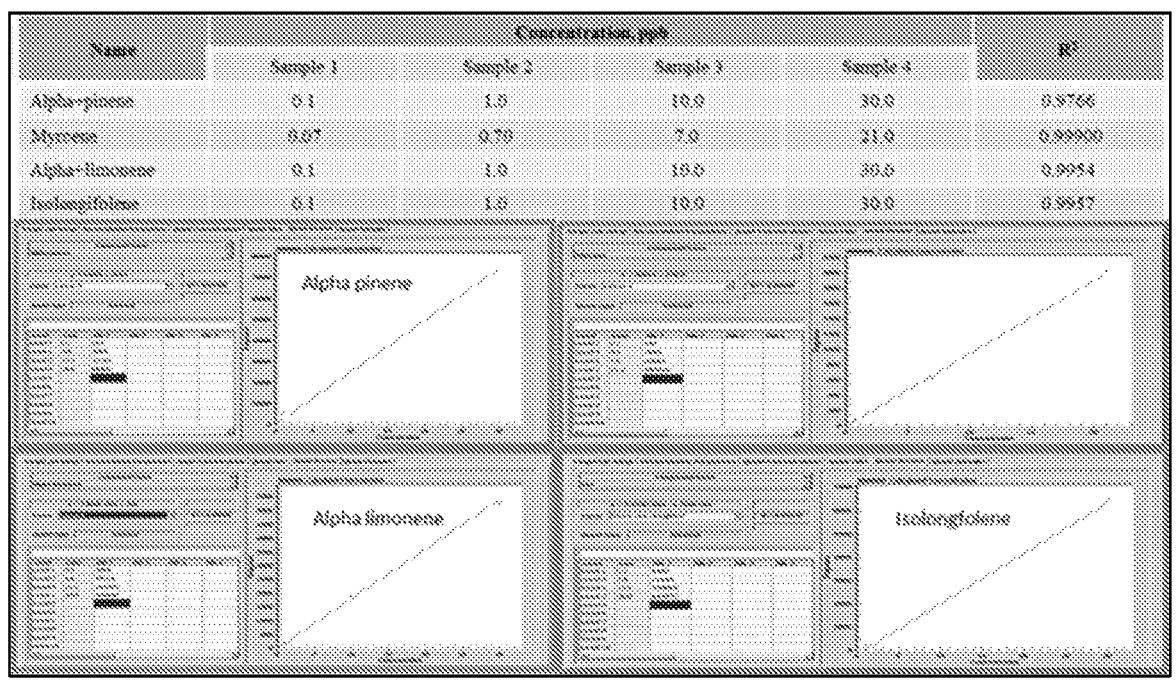
FIG. 13 illustrates Calibration plots of the four terpene compounds.

A four-point calibration graph was generated for the four terpene compounds. The concentrations of the standards and the respective calibration plots with correlation coefficients (R2) are shown in FIG. 13. It should be noted that the estimated detection limit for the four compounds was 20 ppt, which was based on the statistical analysis of multiple replicates of the lowest standard (Sample 1).

Geosmin is an organic compound produced by a variety of microorganisms and bacteria. It has a distinct earthy flavor and aroma, and is responsible for the earthy taste of beets and the strong scent that occurs in the air when rain falls after a dry spell of weather. Geosmin is produced by several classes of microbes, including cyanobacteria and actinobacteria, and is released when these microbes die. Communities whose water supplies depend on surface water can periodically experience episodes of unpleasant-tasting water when a sharp drop in the population of these bacteria releases geosmin into the local water supply (9). Chemically, it is a bicyclic alcohol with a formula of C12H22O, and a derivative of decahydro naphthalene, commonly known as decalin. Its boiling point is ~270° C.

Figure 14:
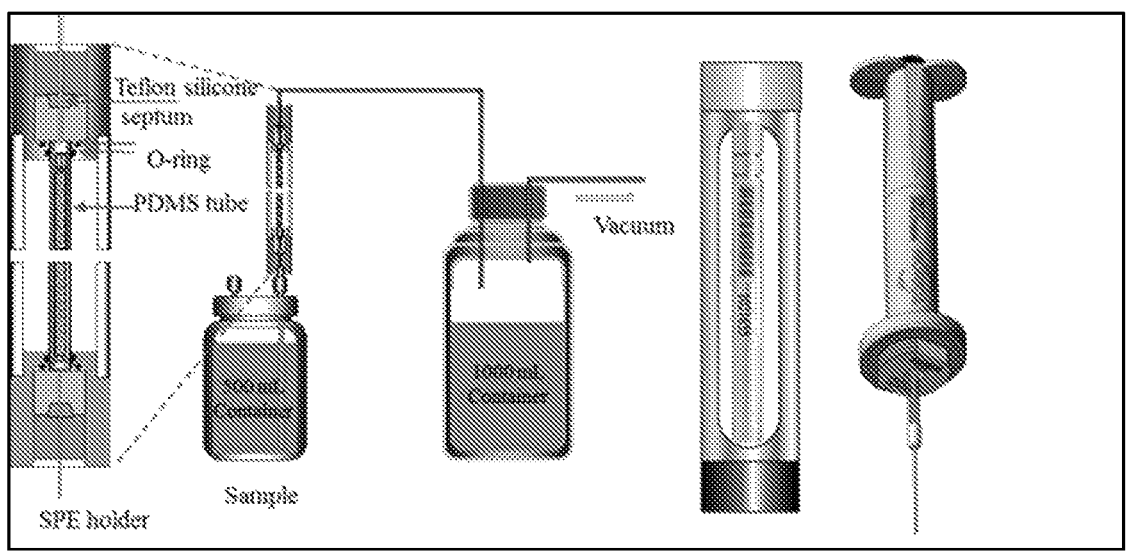
FIG. 14 illustrates the sampling procedure and thermal desorption step for the analysis of geosmin by GC/MS.

The methodology included 20 ppt of Geosmin was spiked into 500 mLs of a water sample. Without any pretreatment step, it was then trapped on Polydimethylsiloxane (PDMS) particles (125-180 um size) packed in a deactivated stainless steel solid phase extraction (SPE) desorption tube at ambient temperature using a flow rate of 25-35 mL/min delivered by a vacuum pump. The target analyte was then transferred into a PDMS needle trap using the instrument's thermal desorber system. The desorption step was carried out at 200° C. at 6 mL/min for 10 min, using He carrier gas. Sample introduction into the GC-TMS using the needle trap was conducted at 270° C. for 60 s. A schematic of the sample delivery approach is shown in FIG. 14.

Figure 15:
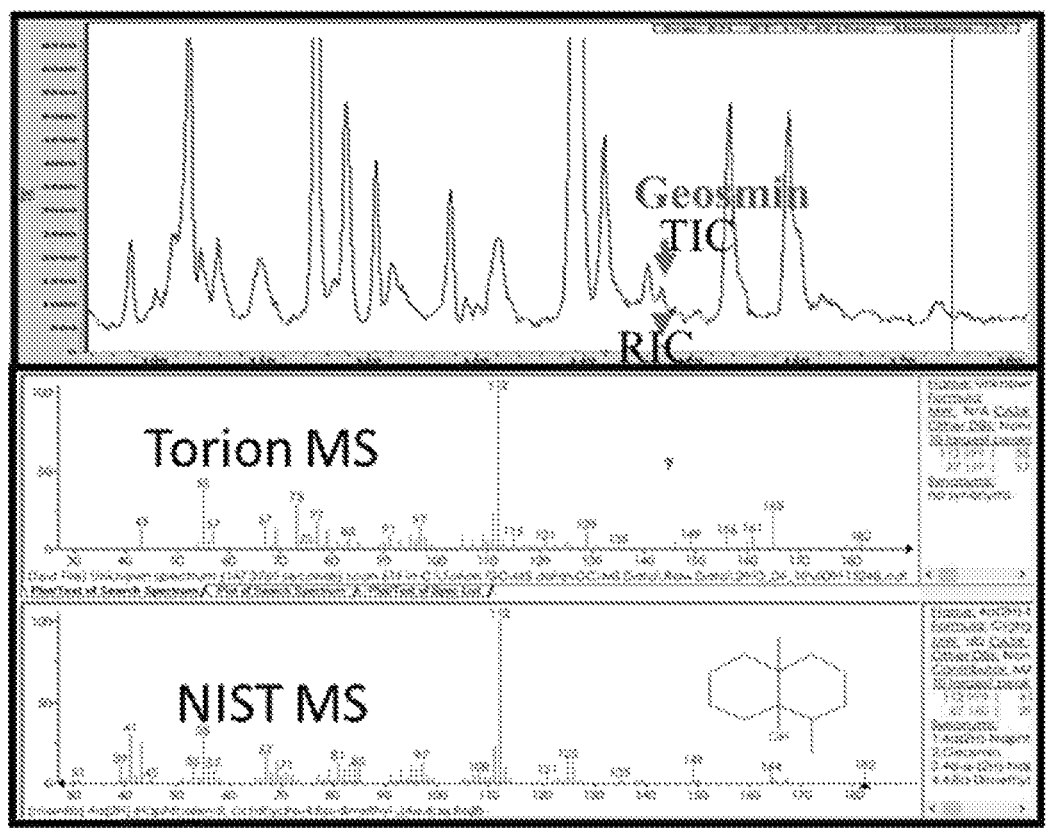
FIG. 15 illustrates Total ion (TIC) and extracted ion chromatograms (MC) of geosmin and its MS fragments in a water sample, identified and confirmed by the mass spectrum from the NIST reference library.
Figure 16:
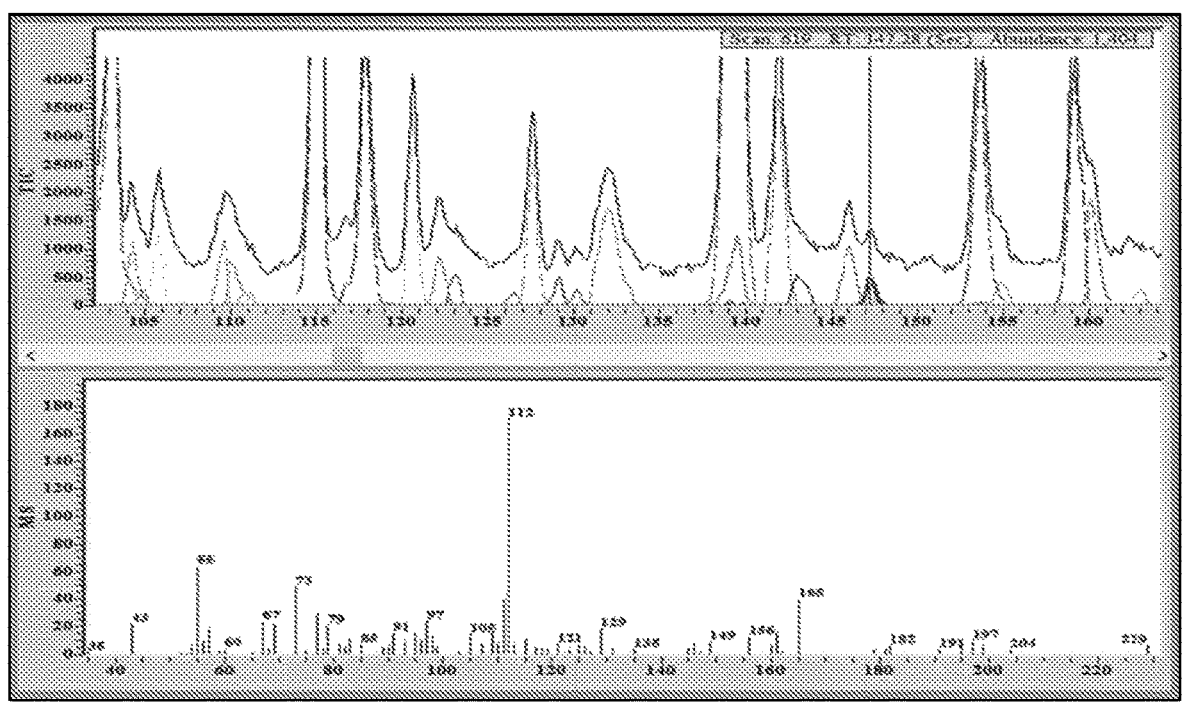
FIG. 16 illustrates the deconvoluted chromatogram and mass spectrum demonstrating that the geosmin is well-separated using the instrument's deconvolution algorithm.

The chromatographic separation conditions are shown in Table 3. The total ion chromatogram (TIC) of the separation is shown in FIG. 15, together with extracted ion chromatogram (MC), showing the parent molecular ion and the associated fragments of geosmin, which is confirmed by the NIST reference mass spectrum underneath it. FIG. 16 shows the deconvoluted chromatogram and mass spectrum, demonstrating that the 20 ppt geosmin is well-separated using the instrument's deconvolution algorithm. Based on the statistical analysis of the geosmin calibration, it was estimated that the detection limit was in the order of single digit ppt levels.

TABLE 3

| Heaters | Temperature Program | Split Injection Time | Column Specifications |
|---|---|---|---|
| Injector 270% $C_x$ | Ramp rate 1° C./s | 10:1 split on 20 s | Length 5 m |
| Transfer line 250° C. | Starting temperature and hold time 50° C. for 10 s | 10:1 split off 40 s | Diameter 0.1 mm |
| MS Trap 190° C. | End temperature and hold time 300° C. for 10 s | 50:1 split on 40 s | Stationary phase MS 5 (5% phenyl 95% methyl polysiloxane) |
| | Carrier gas inlet pressure 26 psi | 50:1 split off 80 s | |

Figure 17:
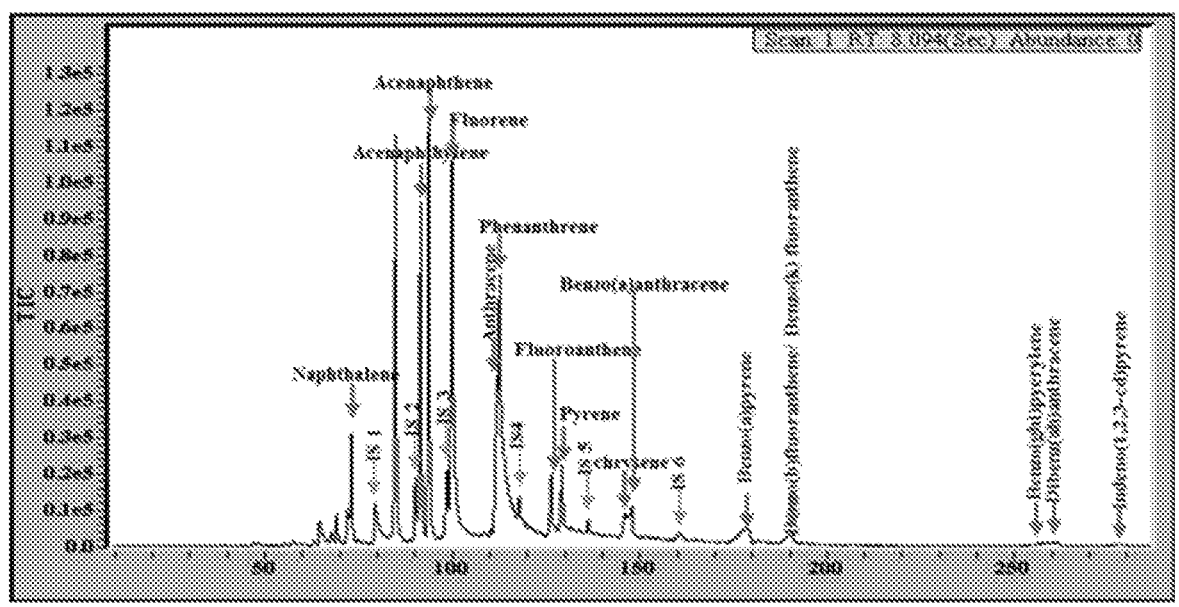
FIG. 17 illustrates a Total Ion Chromatogram of a 250 ppb ppm spiked sample of PAHs.

Road and parking lot surfaces are typically made from asphalt and/or coal tar products which contain high levels of carbonaceous compounds. For this reason, it is very important to know the composition of the PAH levels in the gravel samples used in the road surface preparation process. For this study, 40 g of the gravel samples were spiked with stock standard solutions to make calibration standards of 0.05, 0.25, 0.5, and 1.0 ppm of the PAH analytes. The samples were then extracted with a mixture of dichloromethane (5 mL) and water (~15 mL) by hand shaking for about 2-3 min. The liquid phase was then transferred to another vial to let the two phases separate out. For some of the samples, pre-concentration was necessary to improve the detection. This was achieved by placing 1 mL of the organic phase into a 2 mL vial and allowing the solvent to evaporate to get a suitable volume for the measurement. A 20 µL aliquot of the sample in the organic phase was then introduced into the glass tube using a syringe and the solvent was eliminated using a vacuum pump or air compressor. The target analytes then were transferred into the PDMS needle trap using a sample displacement approach at 300° C. for 5 min with a purging flow rate of 30 ml/min. The GC conditions for the separation are shown in Table 4, while the total ion chromatograph of the separation is seen in FIG. 17, which clearly shows that high molecular weight, high-boiling PAHs such as benzo perylene and benzo fluoranthene have been separated and detected.

TABLE 4

| Sample Delivery | Needle Trap |
| --- | --- |
| Injection Type | Splitless with pre-run split closed |
| Injector Temperature | 290° C. |
| Transfer Line Temperature | 270° C. |
| Trap Temperature | 190° C. |
| Initial Temperature/Hold Time | 50° C. for 10 s |
| Temperature Ramp Rate | 2° C./sec |
| Final Temperature/Hold Time | 300° C. for 150 s |

This portable GC/MS technology of the first embodiment may also be used as a general screening tool for SVOCs in water using micro liquid extraction (MLE) and a coil wire filament (CWF). The experiments were carried out using tap water spiked with SVOCs at concentrations from low ppb-sub ppm levels. A small amount (0.2-0.5 mL) of suitable solvent, such as dichloromethane, hexane, pentane or acetone is used for extraction. Manual shaking and salting-out may be applied using NaCl at 0.5-3% to speed up the extracting process. The extraction is performed for a few minutes, the solvent containing the analytes then applied on to the coil or if necessary, concentrated by letting the solvent evaporate after transferring to a small vial. Sample introduction using the coil is performed after solvent on the coil is evaporated. The screening tests were carried out with mixtures of PAHs, phenolic compounds, phthalate esters, organo-chloride, organo-phosphorus and pyrethroid pesticides and herbicides. However, as has been previously shown, the separation of PAHs and various pesticides will only show representative data for the phenolic compounds and the phthalate esters. The chromatographic separation conditions for the phenols and phthalate esters are shown in Table 5. Table 5 shows the chromatographic separation conditions for the screening of 9 phenolic compounds, 6 phthalate esters. An additional 14 general pesticides, 6 herbicides and 10 insecticides were screened using similar conditions.

TABLE 5

| GC Parameter | Phenols | Phthalate Esters |
| --- | --- | --- |
| Sample Delivery | Coil Wire Filament Injection | Coil Wire Filament Injection |
| Injection Type | Split/Splitless | Split/Splitless |
| Injector Temperature | 290° C. | 300° C. |
| Transfer Line Temperature | 270° C. | 280° C. |
| Trap Temperature | 200° C. | 200° C. |
| Initial Temperature/Hold Time | 50° C. for 10 s | 50° C. for 10 s |
| Temperature Ramp Rate | 2° C./sec | 2° C./sec |
| Final Temperature/Hold Time | 200° C. for 60 s | 300° C. for 60 s |

Figure 18:
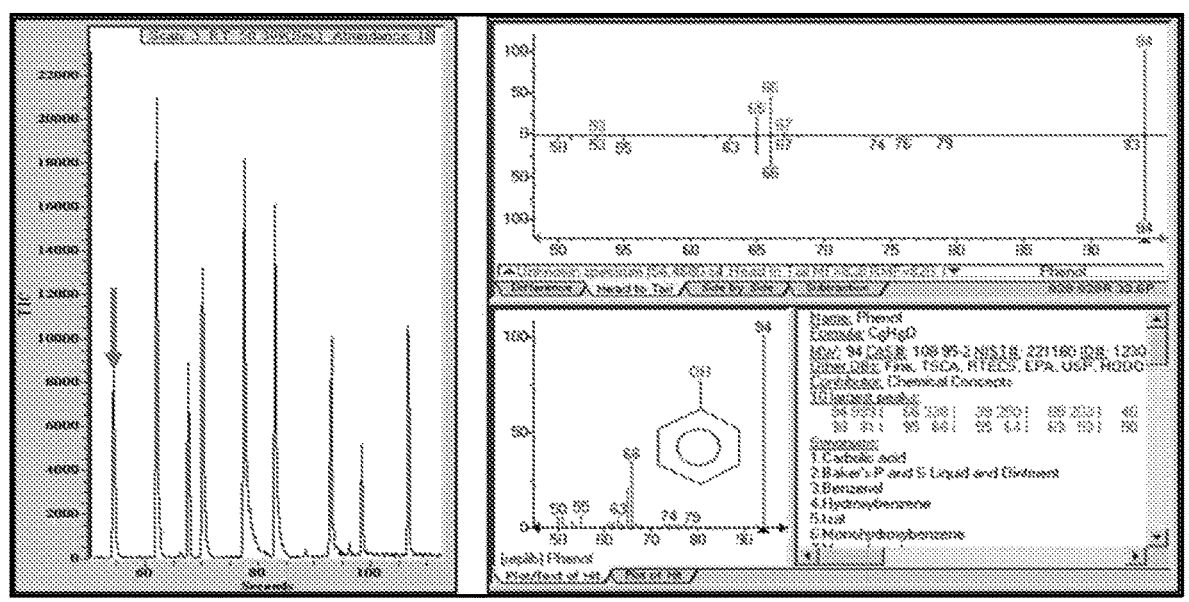
FIG. 18 illustrates the total ion chromatogram of the separation of all the phenolic compounds in water with phenol (C6H5OH) identified with the bold red arrow.

FIG. 18 shows the total ion chromatogram of the separation of all the phenolic compounds in water, with phenol (C6H5OH) identified with the bold red arrow. The extracted ion chromatogram of phenol is shown on the right with the reference mass spectrum from the NIST library below it. The full suite of phenols identified from left to right are (1) phenol (2) 4-methyl phenol, (3) 2-nitro phenol, (4) 3,5-dichloro phenol, (5) 4-chloro-3-methyl phenol, (6) 2,4,6-trichloro phenol, (7) 4-nitro phenol, (8) 2-methyl-4,6-dinitro phenol, and (9) pentachloro phenol.

Figure 19:
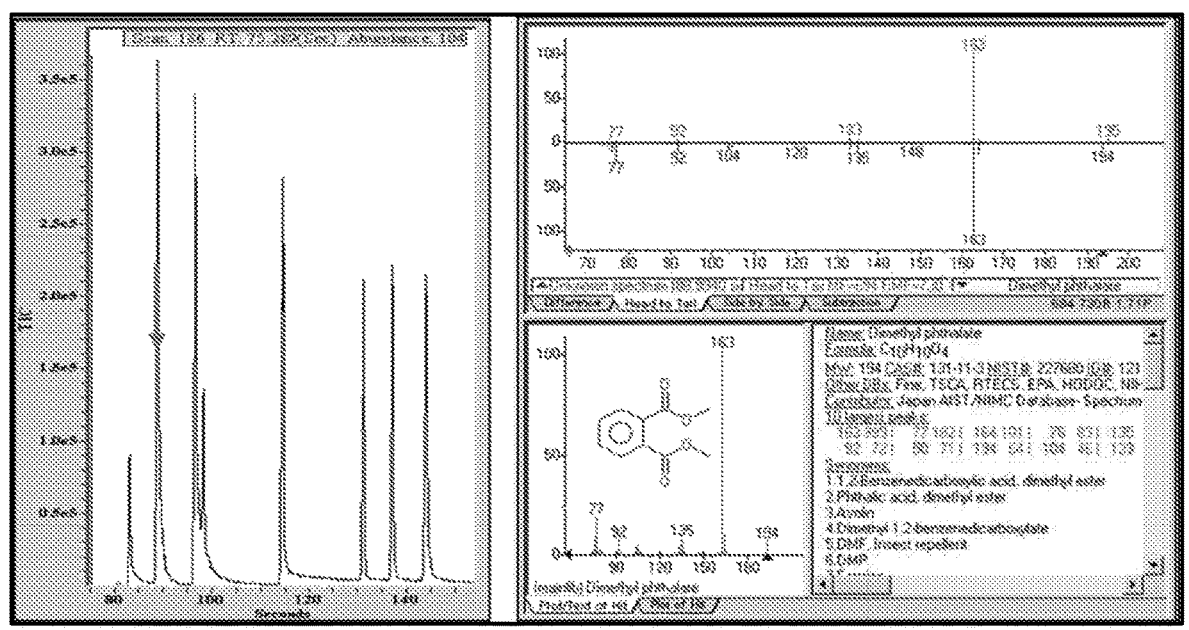
FIG. 19 illustrates the total ion chromatogram of the separation of a group of phthalate esters with dimethyl phthalate (C10H10O4) shown with a bold red arrow.

The group of phthalate esters is shown in FIG. 19, with dimethyl phthalate (C10H10O4) shown with the bold red arrow. The extracted ion chromatogram of dimethyl phthalate is shown on the right, with the reference mass spectrum from the NIST library below it. The full suite of phthalate esters identified from left to right are (1) dimethyl phthalate, (2) diethyl phthalate, (3) dibutyl phthalate, (4) benzyl butyl phthalate (5) di-iso-octyl phthalate and (6) di-n-octyl phthalate.

The total running time for these screening tests for both phenols and phthalate esters, was less than 3 min. Ion molecule chemistry occurred to some degree on both types of samples, so absolute identification was confirmed using the NIST library search capability. Although the peak capacities are relatively low for these separations, the deconvolution algorithm helped to separate and identify the analytes with greater accuracy. Dynamic ranges and detection limits in real samples will be determined and presented in a future study.

There is a growing demand for the analysis of trace levels of volatile and semi-volatile organic compounds in air, water and solid matrix samples under harsh conditions in remote, field-based locations. This study has demonstrated that it is now possible to achieve laboratory-grade performance with a portable GC-MS combined with rapid sample preparation/introduction techniques. This combination enables a wide variety of environmental-based assays for both quantitative and qualitative screening purposes, which can provide fast, actionable data for non-technical and inexperienced operators in the field.

It has been demonstrated that the technology used in this study of the first embodiment has detected SVOCs relevant to terpenes, plant protection chemicals, and polycyclic aromatic hydrocarbons (PAHs), with very high temperature boiling points (up to 550° C.), at low ppt concentrations in under 10 minutes total analysis time. It has also shown the detection of natural compounds such as geosmin can be detected in water at low ppt levels. In addition, the screening of phenolic compounds and phthalate esters in drinking water can be carried out at low ppb levels. As a result, the employment of portable GC/MS and associated sampling techniques provide the required sensitivity, selectivity, and speed of analysis for the effective analysis of high-boiling-point SVOCs in the field.

Those skilled in the art will readily appreciate that many modifications are possible in the example embodiments without materially departing from this first embodiment or the invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A heating system for a chromatography system, the heating system comprising:
   an inner ring;
   a heating wire wound circumferentially around the inner ring;
   a middle ring disposed around the heating wire and the inner ring, wherein the heating wire is in contact with an inner surface of the middle ring, wherein the heating wire is enclosed between the inner ring and the middle ring;

a chromatography column disposed circumferentially and in a single layer around and in contact with an outer surface of the middle ring; and an outer ring disposed circumferentially around the chromatography column and the middle ring.

2. The heating system of claim 1 wherein the heating wire is wound circumferentially around the inner ring a plurality of times.

3. The heating system of claim 2 wherein windings of the heating wire are equally spaced apart.

4. The heating system of claim 2 wherein windings of the heating wire are in contact with one another.

5. The heating system of claim 1 wherein the outer surface of the middle ring is substantially smooth such that the chromatography column makes continuous contact therewith.

6. The heating system of claim 1 further comprising a temperature sensor on the inner ring.

7. The heating system of claim 1 wherein a diameter of the outer ring is 10 cm or less.

8. The heating system of claim 1 wherein first and second wings extend away from the outer ring.

9. The heating system of claim 1 wherein the outer ring comprises a plurality of tabs that are folded around the inner ring.

10. The heating system of claim 1 wherein the inner ring is formed of aluminum.

11. The heating system of claim 1 wherein the middle ring is formed of aluminum.

12. The heating system of claim 1 wherein the outer ring is formed of aluminum.

\* \* \* \* \*